United States Patent [19]
Nunez et al.

[11] Patent Number: 5,648,402
[45] Date of Patent: Jul. 15, 1997

[54] CONTACT LENSES FROM HIGHLY PERMEABLE SILOXANE POLYOL MATERIAL

[76] Inventors: Ivan M. Nunez, 1844 Grassington Way N., Jacksonville, Fla. 32223; Frank F. Molock, 1543 Wildfern Dr., Orange Park, Fla. 32073; Laura D. Elliott, 9480 Princeton Sq. Blvd. #1210, Jacksonville, Fla. 32256; Michele L. Neil, 340 Lolly La., Jacksonville, Fla. 32259; James D. Ford, 515 Nassau Ct., Orange Park, Fla. 32073

[21] Appl. No.: 457,832

[22] Filed: Jun. 1, 1995

[51] Int. Cl.$^6$ .................. C08G 18/61; C08G 18/64; C07H 15/08
[52] U.S. Cl. ............... 523/107; 523/106; 351/160 H; 528/28; 528/73; 536/17.2; 536/18.3
[58] Field of Search ................. 351/160 H; 523/106, 523/107; 528/28, 73; 536/17.2, 18.3

[56] References Cited

U.S. PATENT DOCUMENTS

| | | | |
|---|---|---|---|
| 3,225,012 | 12/1965 | Black et al. | 260/78 |
| 3,356,652 | 12/1967 | Ray-Chaudhuri | 261/78.4 |
| 3,808,178 | 4/1974 | Gaylord | 526/279 |
| 4,153,641 | 5/1979 | Deichert et al. | 526/279 |
| 4,740,533 | 4/1988 | Su et al. | 523/106 |
| 5,070,169 | 12/1991 | Robertson et al. | 528/25 |
| 5,196,458 | 3/1993 | Nunez et al. | 523/106 |
| 5,304,584 | 4/1994 | Nunez et al. | 526/238.23 |

FOREIGN PATENT DOCUMENTS

| | | |
|---|---|---|
| 0 263 061 | 4/1988 | European Pat. Off. . |
| 0 330 614 | 8/1989 | European Pat. Off. . |
| 0 330 615 | 8/1989 | European Pat. Off. . |

*Primary Examiner*—Paul R. Michl
*Assistant Examiner*—Andrew E.C. Merriam

[57] ABSTRACT

The present invention provides soft contact lenses adopted for placement over the cornea or in the eye which have a high oxygen permeability, a low water content and excellent mechanical properties. Moreover, the lenses of the instant invention have excellent protein and lipid deposition resistance relative to conventional contact lenses. Such lenses having the properties mentioned above comprises a prepolymer which contains an alkoxylate glucoside that is derivatized with at least one polysiloxane compound. The prepolymer is then placed in a suitable mold and polymerized by exposure to ultraviolet light.

7 Claims, 2 Drawing Sheets

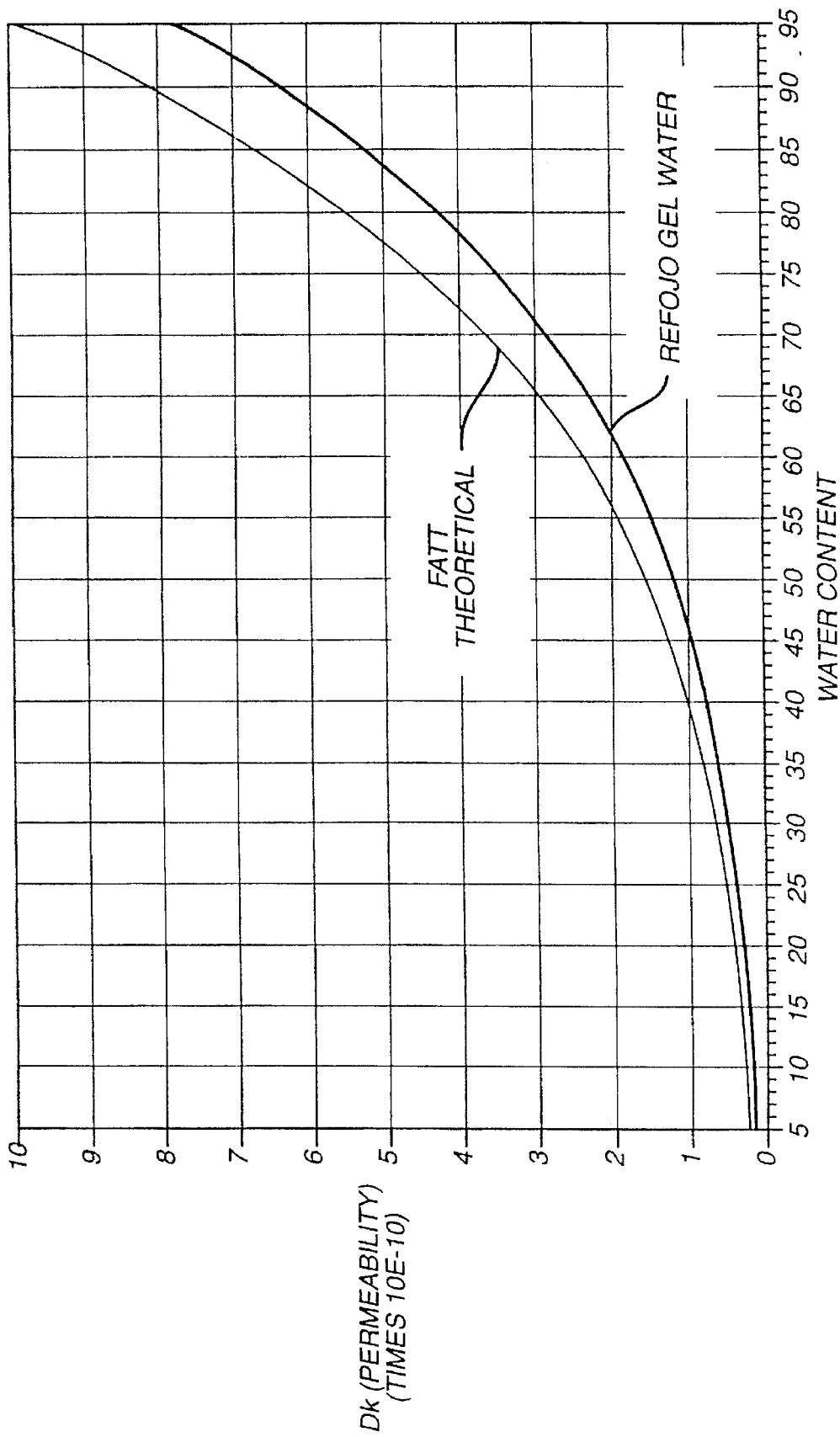

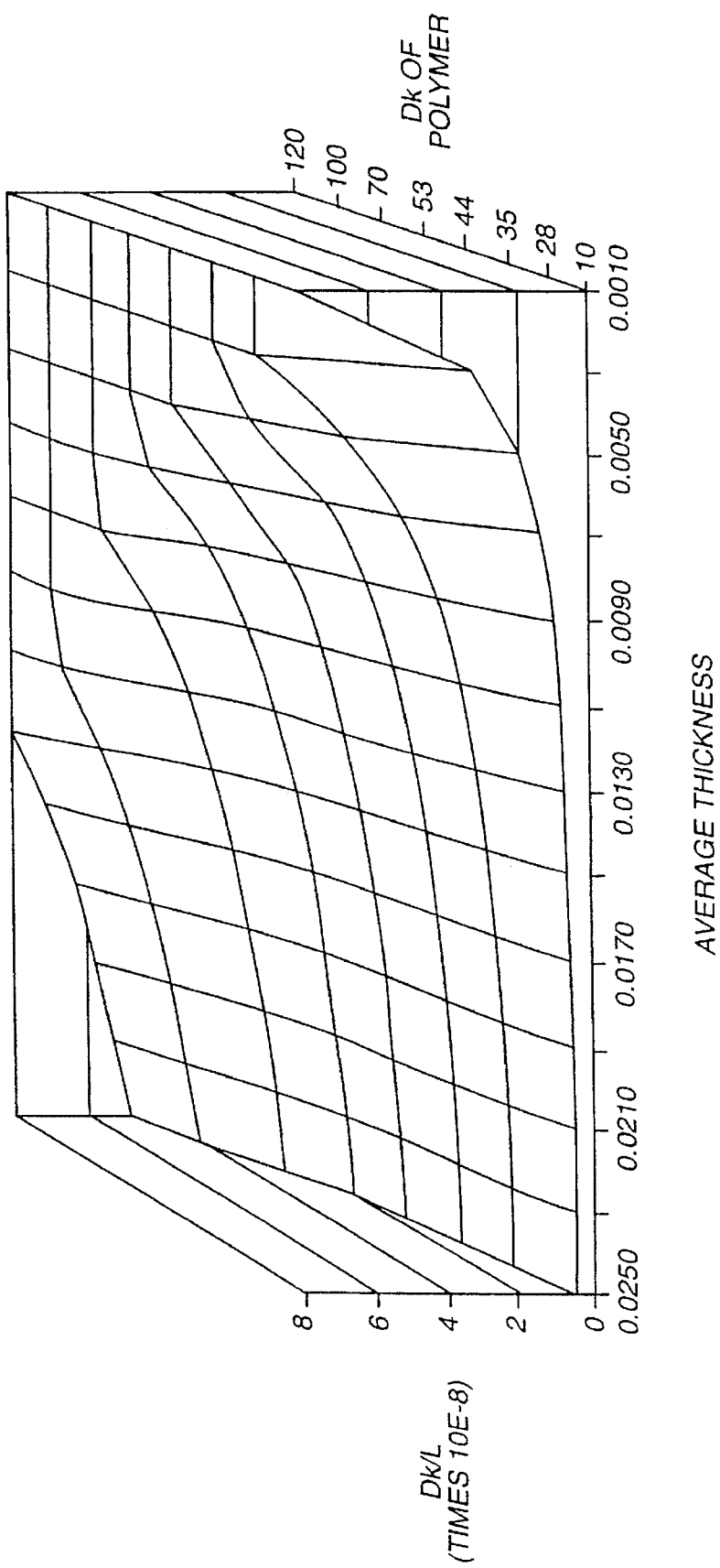

CONTACT LENSES FROM HIGHLY PERMEABLE SILOXANE POLYOL MATERIAL

FIELD OF THE INVENTION

The present invention relates to soft ophthalmic contact lenses and to methods for preparing the same. More specifically, the soft ophthalmic contact lenses of the instant invention are made from a prepolymer which comprises an alkoxylated glucoside that is derivatized with at least one polysiloxane compound. The prepolymer is then placed in an appropriate mold and polymerized by exposure to suitable energy source such as ultraviolet light. Such contact lenses comprising the polymer of the present invention have a high oxygen ($O_2$) permeability, a desirable water content and excellent mechanical properties. Additionally, the contact lenses of the instant invention have improved protein and lipid deposition resistance compared to conventional contact lenses and are softer and more comfortable to wear than rigid gas permeable lenses.

BACKGROUND OF THE INVENTION

Any ophthalmic lens must meet a variety of criteria in order to be acceptable for wear. Foremost for a contact lens, any material placed over the cornea of the eye must in some way provide for the passage of oxygen to the eye as well as remove waste products away from the eye. With hydrated soft contact lenses this is accomplished by having a material that, inherent with its high water content (sometimes over 50%), passes oxygen to the eye via the water contained in the lens.

Hydrated soft contact lenses, however, can act as a wick, drawing water way from the tear fluid in the eye and hastening its evaporation. This results in the "dry eye" effect, wherein an excess of moisture is drawn away from the eye by the hydrophilic lens.

In contrast, hard contact lenses do not exhibit this wicking effect because water does not absorb and pass through the lens, but rather is underneath the lens. A hard lens, however, can have a deleterious effect on the eye because of its non-pliable nature and the movement of the lens over the cornea whenever the wearer blinks can cause mechanical agitation.

Other desirable and undesirable characteristics are divided between hard and hydrated soft contact lenses.

For example, hard contact lenses do not absorb proteins and lipids to the extent that a high water content hydrogel does. The semi-rigid and hard lenses do adsorb some surface proteins and lipids, but these low water content materials absorb no proteins or lipids into the bulk material. Proteins and lipids are taken into the material of the soft lenses along with the tear fluid where they may be deposited. In general, this necessitates cleaning of the hydrated lens to remove protein and lipid deposits. Furthermore, hard contact lenses typically exhibit a higher strength and higher refractive index because they contain more plastic and less water allowing them to be made thinner.

Soft hydrated contact lenses have enjoyed wide acceptance because of the high degree of comfort and extended period of wear that such lenses exhibit. Most soft hydrophilic contact lens polymers produced over the last decade have strived to increase the water content of the material because of the water's contribution to wearer comfort and the passage of oxygen and carbon dioxide through the lens. This increase in water content, however, leads to the aforementioned problem with wicking of moisture away from the eye and also reduces the refractive index of the lens (i.e., the ability of the lens to bend light), and decreases the stiffness of the lens resulting in poorer handling properties. This in turn requires the lens to be thicker in order to meet the refractive index requirements necessary for the optical correction needed by the wearer.

If a lens material is either not permeable enough to oxygen and carbon dioxide, or does not provide the "tear pumping" action required to move the tear layer between the cornea and the lens to transport oxygen and carbon dioxide, negative physiological responses occur, which include: acidosis, decreased metabolic rates, thinning of the cornea, microcysts, and stromal edema.

Other physiological problems can occur even with high permeable lenses from effects such as protein deposits, lens ageing, occlusions, mechanical abrasion and bacteria contamination such as acute inflammation, acute red eye, and 3 and 9 o'clock staining of the central cornea.

The importance of water content for oxygen permeability in a hydrogel contact lens is shown in FIG. 1. Permeability of a gas through a material is expressed as a quantitative value given by Dk, which is equal to the diffusion constant, D, times the solubility, k. At 35° C., Dk for a typical hydrogel lens is quantitatively expressed as $(2.0 \times 10^{-11}) e^{(0.0442(\text{``\%} H_2O\text{''}))}$ (cm×mm/s)(ml $O_2$/ml×mm Hg).

Despite the increased water content of hydrogel contact lenses, current hydrogel lenses may not supply the cornea with enough oxygen, and corneal edema, during wear, may not be as low as desired.

It is believed that extended wear contact lenses would at a minimum need to have a Dk/L (where L being the thickness of the lens) between $75 \times 10^{-9}$ and $90 \times 10^{-9}$ (cm×ml $O_2$)/(s×ml×mm Hg) to reduce corneal edema to an acceptable level.

Current high water contact lenses, for example, those that are approximately 70% water or higher, need to be made at approximately 140 to 250 microns thickness to achieve the necessary optical and physical properties. With this water content and at this thickness, it is seen in FIG. 2 that the Dk/L is about $55 \times 10^{-9}$. Even with a hydrogel material having a water content of 80% and with a Dk equal to 53, a lens would have to be produced at approximately 70 microns in order for Dk/L to be $75 \times 10^{-9}$.

As stated above, however, increasing the water content tends to lower the refractive index of the contact lens material and therefore requires an increase in lens thickness. Even if this were not the case, however, thinner contact lenses have lower strength, less desirable handling properties and, at high water content, tend to dehydrate to such an extent that corneal staining may occur.

Examples of the current practice in the art of producing polymers for contact lenses is shown in European Patent Application Nos. 0 330 614 and 0 330 615. These publications describe contact lens polymers containing polyoxyalkylene and having the usual desirable properties of a soft contact lens, but both are described as containing, in the hydrated state, between 10% and 90% water, preferably between 35% and 55%, water by weight.

European Patent Application No. 0 263 061 also describes a contact lens material consisting of a polyoxyalkylene backbone unit which absorbs less than 10% water by weight. This polyoxyalkylene backbone forms a polymer which requires the addition of carbonyl containing monomers to induce surface wettability, but which also lowers oxygen permeability. EP-A Nos. 330614, 330615 and 330618 use polyether and carbamate linkages to produce contact lens polymers of both low and high water content but also use small molecular weight monomers to increase the water content of the base polymer. Each of the aforementioned references however fail to teach the use of more biocompatible materials such as sugars which contain carbon atoms bonded to two oxygen atoms (geminal) as part of their structures. The materials of the references also require large amounts of hydrophilic modifiers to induce wettability and silicon materials require surface treatment of some type.

U.S. Pat. No. 3,225,012 discloses a polymer that is prepared by polymerizing 1,2: 5,6-di-O-isopropylidene-3-O-methacryloyl-D-glucose and then removing the isopropylidene groups from the glucose by acid hydrolysis. U.S. Pat. No. 3,356,652 describes a polymer that is derived from 2-(D-glucose)oxyethyl methacrylate. Both U.S. Pat. Nos. 3,225,012 and 3,356,652 use the glucose component of the polymer as a terminated pendant group off of a repeating carbon backbone, and not as the primary repeating group from which the polymer chain is formed.

U.S. Pat. No. 5,196,458 provides a lower water content lens material having high $O_2$ permeability, a lower water content and reduced polymer matrix size. The lens provided in this reference is prepared by polymerizing and crosslinking a prepolymer which contains a cyclic polyol such as an alkoxylated glucose or sucrose with polyalkylether segments.

Polysiloxane compounds (co)-polymerized with various monomers such as acrylic esters and alkyl acrylic esters have also been employed in the prior art to provide contact lenses with higher oxygen permeabilities. Such lenses containing polysiloxane compounds are disclosed, for example, in U.S. Pat. Nos. 3,808,178; 4,153,641; 4,740,533; and 5,070,169.

Despite the current state in the art there is still a continued need to provide soft contact lenses which are comfortable to wear, strong, have low water content, and extremely high oxygen permeability, but do not wick water away from the eye nor allow protein or other tear components to penetrate and deposit on the cornea of the eye.

SUMMARY OF THE INVENTION

The present invention is directed to soft polymeric material useful in fabricating contact lenses, intraocular lenses, and other medical devices and implants. It will be described herein with reference to ophthalmic contact lenses adapted for placement over the cornea or in the eye. Contact lenses of the present invention have a high $O_2$ permeability, a low water content and a good balance of physical properties, such as tensile strength, modulus and elongation. Specifically, soft contact lenses of the present invention are made from a polymer having repeating units of the following structural formula:

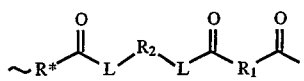
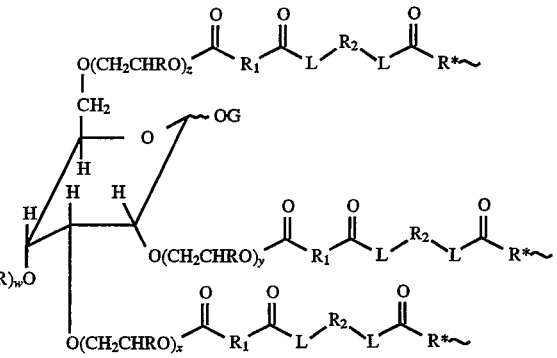

wherein each R is independently hydrogen or methyl; G is an alkyl group containing from 1 to about 7 carbon atoms; each $R_1$ is independently —NH—D—NH— wherein D is a hydrocarbyl residue containing 4 to 15 carbon atoms and 0, 1 or 2 optionally fused rings which can be saturated or unsaturated; each $R_2$ is independently a moiety of formula (i) or (ii) which are as follows

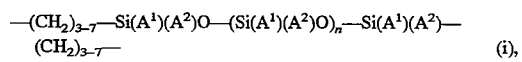

or

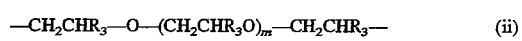 (ii)

wherein $A^1$ in each occurrence is an alkyl group containing from 1 to about 3 carbon atoms or benzyl, $A^2$ in each occurrence is an alkyl group containing from 1 to about 3 carbon atoms, $R_3$ is hydrogen or methyl; n is from about 10 to about 300, and m is from about 5 to about 100, provided that $R_2$ in at least one occurrence is a moiety of formula (i);

each L is independently —O— or —NH—, such that each —C(O)L— in the above formula is independently —C(O)O— or —C(O)NH—;

each R* is independently

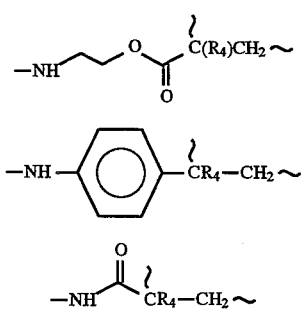

-continued

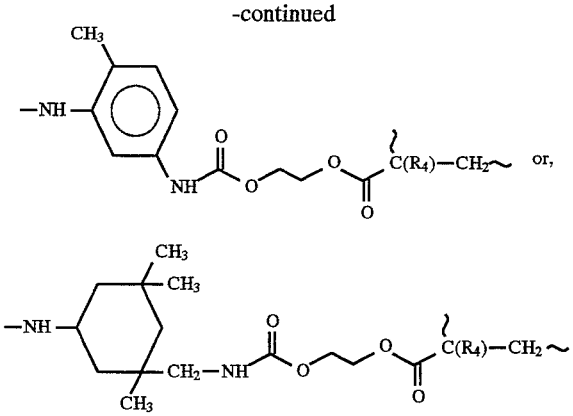

and $R_4$ is hydrogen or methyl; each of w, x, y and z independently range from 0 to 200, with the proviso that $5 \leq (w+x+y+z) \leq 200$.

In accordance with another aspect of the instant invention, methods for preparing the above-identified polymer from a prepolymer are provided. In accordance with this aspect of the instant invention, a prepolymer comprising an alkoxylated glucoside that has been derivatized with at least one polysiloxane compound is first prepared and thereafter the prepolymer is placed in an appropriate mold and polymerized by exposure to a suitable energy source such as ultraviolet (UV) light.

BRIEF DESCRIPTION OF THE DRAWINGS

FIG. 1 is a graph showing the relationship (theoretical and measured) between oxygen permeability and water content for a hydrogel.

FIG. 2 is a graph showing the relationship among lens thickness, Dk of a material and material transmissibility (Dk/L).

DETAILED DESCRIPTION OF THE INVENTION

A contact lens is made from a polymer having the properties described above by first preparing a prepolymer having the following chemical structure:

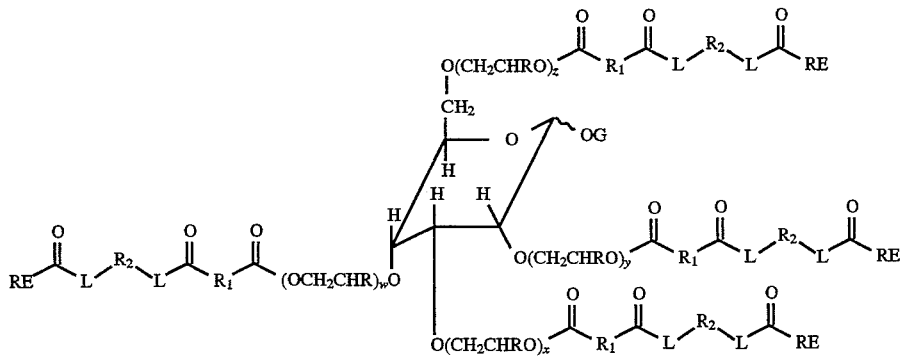

wherein each R is independently hydrogen or methyl; G is an alkyl group containing from 1 to about 7 carbon atoms, preferably methyl; each $R_1$ is independently —NH—D—NH— wherein D is a hydrocarbyl residue containing 4 to 15 carbon atoms and 0, 1 or 2 optionally fused rings which can be saturated or unsaturated; preferred embodiments of —NH—D—NH— being residues of toluene diisocyanate or of isophorone diisocyanate, having respectively the structures:

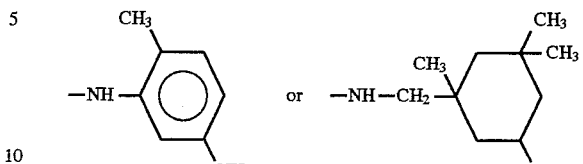

each $R_2$ is independently a moiety of formula (i) or (ii) as follows:

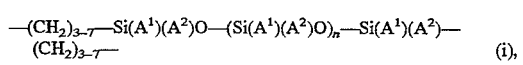

or

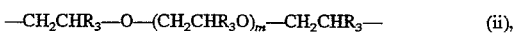

wherein $A^1$ in each occurrence is an alkyl group containing from 1 to about 3 carbon atoms, preferably methyl, or benzyl, $A^2$ in each occurrence is an alkyl group containing from 1 to about 3 carbon atoms, preferably methyl, each $R_3$ is independently hydrogen or methyl; n is from about 10 to about 300, and m is from about 5 to about 100, provided that $R_2$ in at least one occurrence is a moiety of formula (i);

each L is independently —O— or —NH— each RE is independently

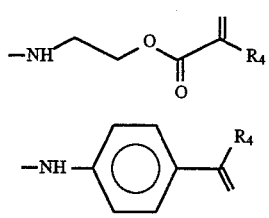

-continued

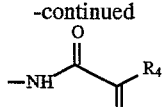

-continued

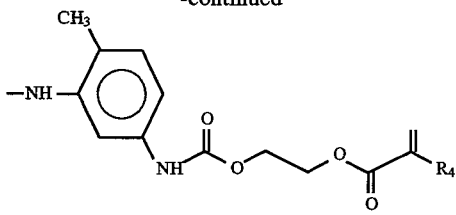

or,

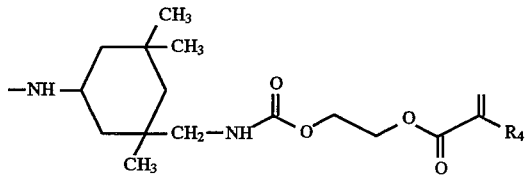

preferably RE is —NH(CH$_2$)$_2$OC(O)CH(R$_4$)=CH$_2$, each R$_4$ is independently hydrogen or methyl; each of w, x, y and z independently range from 0 to 200, with the proviso that 5≦(w+x+y+z)≦200. It is emphasized that L is defined herein such that each —C(O)L— in the above formula independently is —C(O)O— or —C(O)NH In accordance with the most preferred embodiment of the present invention, each R$^2$ of the prepolymer shown hereinabove has the formula

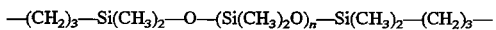

wherein n is from about 15 to about 225.

The above-identified prepolymer is prepared in the present invention by reacting one or more precursors selected from the group consisting of compounds of formula (iii) below

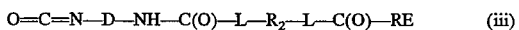   (iii)

wherein D, L, R$_2$ and RE are as defined above, with one or more alkoxylated glucosides of the formula

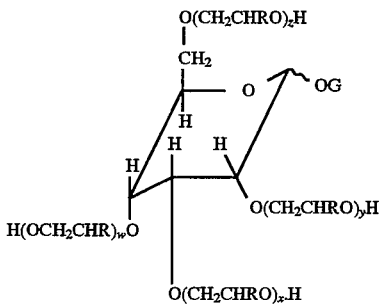

wherein G, R, w, x, y and z are as defined above, in relative amounts of said precursor to said glucoside and under conditions effective to form the prepolymer.

The precursor compounds described in formula (iii) above are prepared in the present invention by first reacting a compound having one of the following formulas:

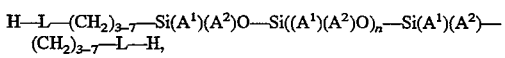

or

H—L—CH$_2$CHR$_3$—O—(CH$_2$CHR$_3$O)$_m$—CH$_2$—CHR$_3$—L—H wherein L, A$^1$, A$^2$, R$_3$ and m are as defined hereinabove, with about equimolar amounts of one or more compounds of the following formulas:

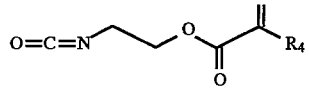

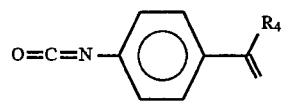

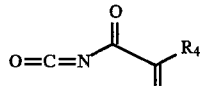

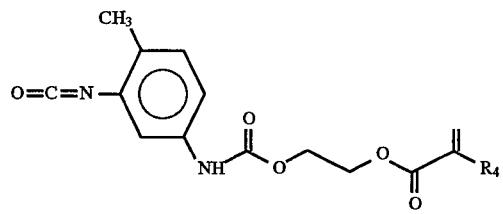

or,

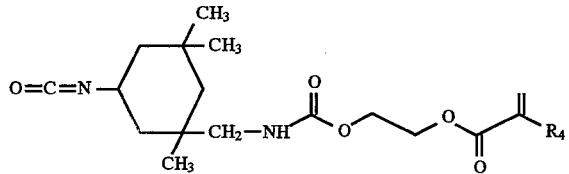

wherein R$_4$ is as defined hereinabove, or analogous compounds wherein in place of —N=C=O group there is another moiety reactive with the —L—H group in the formulas given above. Suitable reactive moieties include halogen, particularly chloro, and anhydride linkages.

The product of the above reaction is then reacted with a diisocyanate under conditions effective to form the precursor compound or compounds described hereinabove.

Any organic diisocyanates may be used in the process according to the invention. It is preferred to use isocyanates of the formula D(NCO)$_2$ wherein D is a hydrocarbyl residue containing 4 to 15 carbon atoms and 0, 1 or 2 optionally fused rings which can be saturated or unsaturated. Preferably, D represents an aliphatic hydrocarbon group containing from 4 to 12 carbon atoms, a cycloaliphatic hydrocarbon group containing from 6 to 15 carbon atoms, an aromatic hydrocarbon group containing from 6 to 15 carbon atoms or an araliphatic hydrocarbon group containing from 7 to 15 carbon atoms. The most preferred diisocyanates are toluene diisocyanate, diphenylmethane diisocyanate, and isophorone diisocyanate, (1-isocyanato-3,3,5-trimethyl-5-isocyanatomethyl cyclohexane). The following are examples of other preferred diisocyanates: tetramethylene diisocyanate, hexamethylene diisocyanate, dodecamethylene diisocyanate, 1,4-diisocyanato-cyclohexane, 4,4'-diisocyanatodicyclohexylmethane, 4,4'-diisocyanato-dicyclohexyl-propane-(2,2); 1,4-diisocyanato-benzene, 2,4-diisocyanatotoluene, 2,6-diisocyanatotoluene, 4,4'-diisocyanatodiphenylmethane, 4,4'-diisocyanatodiphenyl-propane-(2,2), p-xylylene-diisocyanate, a,a,a',a'-tetramethyl-m or p-xylylene-diisocyanate and mixtures of these compounds. Mixtures of any of the foregoing can also be used.

Compounds having the formula H—L—(CH$_2$)$_{3-7}$—Si(A$^1$)(A$^2$)O—(Si(A$^1$)(A$^2$)O)$_n$—Si(A$^1$)(A$^2$)—(CH$_2$)$_{3-7}$—L—H are referred to herein as polysiloxane compounds. These polysiloxane compounds can be synthesized by known means; many are commercially available, such as from Huls America, Inc. sold under the tradenames PS510, PS513, PS555 and PS556.

Compounds having the formula H$_2$N—CH$_2$CHR$_3$—O—(CH$_2$CHR$_3$O)$_m$—CH$_2$CHR$_3$—NH$_2$ employed in the present invention are also commercially available from Huntsman Chemical Company and are sold under the tradename "Jeffamines".

The relative amounts of precursor to alkoxylated glucoside employed in the above reaction may vary however depending on the desired lens being produced. For example, if a high modulus lens is desired an equal amount of the precursor compound and alkoxylated glucoside will be employed. Conversely, if a high surface wettable lens is desired less of the precursor compound relative to the alkoxylate glucoside will be employed. Typically, in the present invention the one or more precursor compounds defined in formula (iii) and (iv) are reacted with the one or more alkoxylated glucosides, in a ratio from about 1 to about 4 moles of said precursor compound to 1 mole of said alkoxylated glucoside.

Derivatizing agents such as acrylic anhydride, methacrylic anhydride, and 4-vinylbenzoyl chloride are useful agents to render any of these glucosides free radical reactive.

Alkoxylated glucosides having the above formula can be purchased from a number of sources. Typically the total number of the ethoxy and propoxy units equals 10 to 20 per molecule of glucoside. Alkoxylated glucosides included in the above formula can be synthesized by known means. Many are commercially available, such as from Amerchol Corporation, sold under the tradenames Glucam E-10, E-20, P-10, and P-20 with the "E" denoting an ethylene oxide adduct and the number representing the number of moles of ethylene oxide added. Likewise, the "P" denotes a propylene oxide adduct with 10 and 20 moles of propylene oxide added respectively. Customized amounts of alkoxylation may be t used, however, with the range from about a total of 5 to 200 alkoxy units per molecule of glucoside.

The reaction of the precursor compound and the alkoxylated glucoside is carried out in the presence of a suitable organic solvent which is capable of readily dissolving the alkoxylated glucoside. Useful organic solvents that may be employed in the present invention include acetonitrile, methylene chloride, chloroform and carbon tetrachloride. Of these organic solvents, methylene chloride is particularly preferred in the present invention.

Prior to their use, the solvents should be purified to remove any contaminant that may adversely affect the above reaction. Purification of the solvent can be carried out using any conventional procedure that is commonly employed in the art. For example, the solvent can be purified by passing it over molecular sieves or by distillation.

The above reaction is also preferably carried out in the presence of an appropriate urethane catalyst. Suitable urethane catalysts that can be employed in the present invention include amines, such as trimethylamine, triethylamine, 1,4-diazabicyclo(2.2.2)octane, 4,4-dimethylamino pyridine and N,N-dimethyl-benzylamine; or organometallic catalysts, such dibutyltin dilaurate, sodium acetate and stannous octoate. Stannous octoate is the preferred urethane catalyst employed in the present invention.

The conditions to employ are virtually any under which the desired reaction of isocyanate groups and hydroxyl groups or amino will proceed. Suitable conditions for any given set of reactants can readily be determined by reference to the examples herein and by simple experimentation.

After the prepolymer has been formed, the organic solvent is removed using conventional methods well known in the art, such as filtration, evaporation and decantation, yielding a viscous prepolymer having the above described formula.

The prepolymer of the instant invention is then polymerized under conditions sufficient to form the polymer of the instant invention. Preferably, the prepolymer is polymerized with heat and/or actinic radiation in the presence of a free radical initiator, a heat/thermal initiator, and, optionally, a diluent that is non-reactive with the prepolymer.

Acceptable initiators employed in the present invention include azo compounds, such as 2,2-azo-bisisobutyronitrile, 2,2'-azo-bis-(2,4-dimethylvaleronitrile), 1,1'-azo-bis-(cyclohexane carbonitrile), 2,2'-azo-bis-(2,4-dimethyl-4-methoxyvaleronitrile) and phenyl-azo-isobutyronitrile; photoinitiators, such as benzoin methyl ether, 1-hydroxycyclohexyl phenyl ketone and 2-hydroxy-2-methyl propiophenone; ionizing rays, such as gamma rays or X-rays; or peroxides, such as di-tert-butyl peroxide, benzoyl peroxide, lauryl peroxide, decanoyl peroxide, acetyl peroxide, succinic peroxide, methyl ethyl ketone peroxide, 2,4-dichlorobenzoyl peroxide, isopropyl peroctoate, tert-butyl hydroperoxide, diisopropyl peroxydicarbonate, tert-butyl perivalate, tert-butyl peroctoate, cumene hydroperoxide, tert-butyl perbenyacetate and potassium persulfate.

initiation using ultraviolet light having a wavelength from about 200 to about 400 nm in the presence of the photoinitiator, 2-hydroxy-2-methyl propiophenone, is particularly preferred in the present invention.

Suitable diluents that may be employed in the present invention include, but are not limited to, alkanols, N,N-dimethylformamide, acetamide, acetonitrile, N,N-dimethylacetamide, heptane, styrene, toluene, dimethylsulfoxide, acetone, tert-butyl acetate, ethyl acetate, isopropyl acetate and N-methyl-2-pyrrolidone. The preferred diluents that may optionally be employed in the present invention are styrene and toluene.

In a preferred embodiment, the prepolymers of the present invention are transferred to a suitable mold, such as those described in U.S. Pat. Nos. 4,889,664 or 4,495,313, and polymerized into an ophthalmic lens by exposure to UV light. Alternatively, the prepolymers of the instant invention can be spun-cast into contact lenses.

The final product is a lens comprised of a polymer having the following repeating units

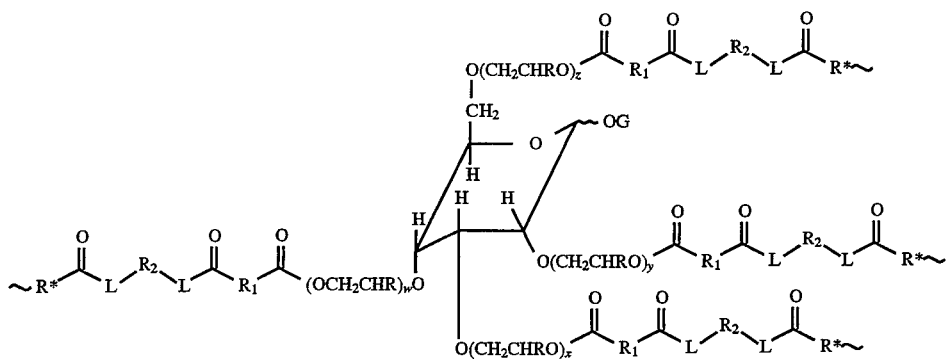

wherein each R is independently hydrogen or methyl; G is an alkyl group containing from 1 to about 7 carbon atoms, preferably $CH_3$; each $R_1$ is independently —NH—D—NH— wherein D is as defined above, the preferred structures for —NH—D—NH— being residues of toluene diisocyanate or isophorone diisocyanate whose structures are, respectively,

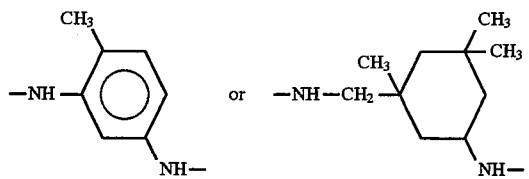

each $R_2$ is independently a moiety of formula (i) or (ii) which are as follows:

$$—(CH_2)_{3-7}—Si(A^1)(A^2)O—(Si(A^1)(A^2)O)_n—Si(A^1)(A^2)—(CH^2)_{3-7}— \quad (i),$$

or $$—CH_2CHR_3—O—(CH_2CHR_3O)_m—CH_2CHR_3— \quad (ii),$$

wherein $A^1$ in each occurrence is an alkyl group containing from 1 to about 3 carbon atoms, preferably methyl, or benzyl, $A^2$ in each occurrence is an alkyl group containing from 1 to about 3 carbon atoms, preferably methyl, $R_3$ is hydrogen or methyl; n is from about 10 to about 300, and m is from about 5 to about 100, provided that $R_2$ in at least one occurrence is a moiety of formula (i);

each L is independently —O— or —NH—;

each R* is independently

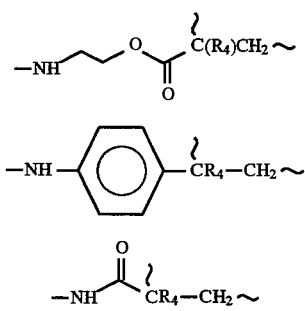

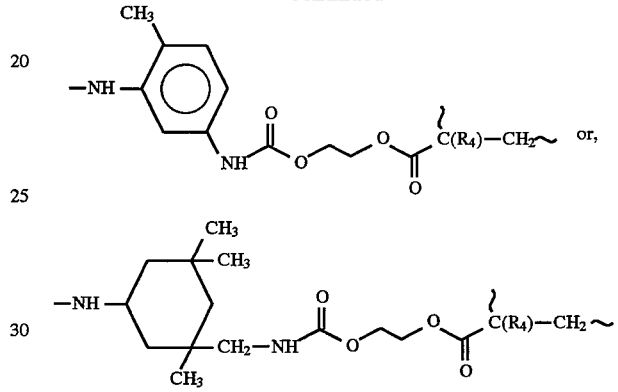

preferably —NH$(CH_2)_2$OC(O)CH$(R_4)$—CH$_2$~, $R_4$ is hydrogen or methyl; each of w, x, y and z independently range from 0 to 200 with the proviso that $5 \leq (w+x+y+z) \leq 200$.

In accordance with the most preferred embodiment of the present invention, each $R_2$ of the polymer has the formula

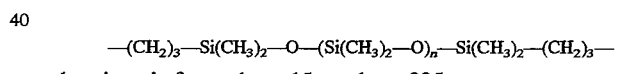

wherein n is from about 15 to about 225.

In accordance with the present invention, the polymer contains from about 2 to about 35 weight % of at least one of the above polysiloxane segments. More preferably, the polymer contains from about 10 to about 32 weight % of a polysiloxane segment. Most preferably, the polymer contains from about 18 to about 24 weight % of a polysiloxane segment.

As stated hereinabove, lenses prepared from the above described polymer exhibit excellent protein and lipid deposition resistance and, in addition, $O_2$ permeabilities much greater than those of most conventional contact lenses. Moreover, the lenses of the present invention comprising the above polymer possess superior mechanical properties compared to most high water content hydrogel materials. Furthermore, the contact lenses of the present invention are softer and more comfortable than prior art lenses.

The following examples are given to illustrate the present invention. As will be apparent to those skilled in the art numerous variations are possible and thus the present invention should not be limited thereto.

EXAMPLE 1

Preparation of 100% PS510 Siloxane Prepolymer

A 100% PS510 siloxane prepolymer was prepared in accordance with the preferred method of the present invention. Specifically, the siloxane prepolymer was prepared using the following three reaction steps:

Step 1

Eighty (80) g (30.8 mmol) PS510, an aminopropyl terminated polydimethyl siloxane resin (molecular weight 2,600 g/mol) obtained from Huls America, Inc., was charged to a 500 mL three neck round bottom flask equipped with a Friedrichs condenser, a drying tube filled with indicating DRIERITE® (anhydrous $CaSO_4$), a 50 mL addition funnel and a magnetic stirring bar. The reaction flask was flamed dried under a nitrogen atmosphere prior to the addition of the resin and any other reagents. Dry methylene chloride, $CH_2Cl_2$, (200 g) and 1000 ppm 4-methoxy hydroquinone (MeHQ) were added to the reaction flask and allowed to stir until the siloxane resin was completely dissolved. To the addition funnel was added 10 g $CH_2Cl_2$ and 4.77 g (30.8 mmol) isocyanatoethyl methacrylate (IEM). This solution was added dropwise, with vigorous stirring, over a period of time of about 1.5 hrs. After this period of time, the addition funnel was rinsed with an additional 10 g of solvent ($CH_2Cl_2$), removed, and replaced with a gas diffuser connected to a dry oxygen cylinder. The reaction mixture was purged with oxygen for 20 min, the gas diffuser was then removed and replaced with a glass stopper. The reaction progress was followed by infrared spectroscopy, monitoring the disappearance of the IEM isocyanate absorption at 2270 $cm^{-1}$. The reaction was allowed to stir overnight, at which point it was found to be completed.

Step 2

To a 1L three neck, round bottom flask equipped with a magnetic stirring bar, a 500 mL addition funnel and a drying tube filled with indicating DRIERITE, was charged with 5.36 g (30.8 mmol) toluene diisocynate (TDI) and 150 g $CH_2Cl_2$. The addition funnel was charged with the mixture from Step 1, and this solution was added to the contents of the 1L round bottom flask dropwise, over a period of about 7 hrs. After the addition was completed, the addition funnel was rinsed with 50 g of solvent, and dry oxygen gas bubbled into the mixture for 30 min. The reaction progress was followed by monitoring the reduction in the intensity of the isocyanate peak. Since TDI has two N=C=O groups, only one of which would react with the amino groups left over from Step 1, the IR adsorption at 2270 $cm^{-1}$ due to these groups would not be expected to disappear completely. Thus, the reaction is followed by observing when this adsorption ceases to change relative to another unchanging peak in the spectrum (e.g. the methacrylate carbonyl group at 1722 $cm^{-1}$). The reaction typically takes about 5–7 days to complete.

Step 3

A 60 mL addition funnel was charged with 11.07 g (10.6 mmol) GLUCAM E-20 (an ethoxylated methyl glucoside—containing 20 moles of ethylene oxide—obtained from Amerchol), 25 g $CH_2Cl_2$, and a catalytic amount of stannous octoate (100–150 mg). This solution was added dropwise, over a period of 3 hrs, to the reaction mixture from Step 2. After the addition was completed, the addition funnel was rinsed with 5 g $CH_2Cl_2$ and the contents of the reaction flask were purged with dry oxygen for 30 min. The reaction progress was followed by monitoring the disappearance of the isocyanate absorption at 2270 $cm^{-1}$. This last step typically took about 7 to about 21 days to complete.

After the reaction was completed, the solvent was removed under reduced pressure in a rotary evaporator yielding a very viscous liquid product which was ready for formulation into a lens.

EXAMPLE 2

Preparation of 100% PS513 Siloxane Prepolymer

Step 1

To a reaction vessel prepared and equipped like the reaction vessel of Example 1, Step 1, was charged 80 g (4.79 mmol) PS513, an aminopropyl terminated polydimethyl siloxane resin (MW 16,700 g/mol) obtained from Huls America, Inc. Dry $CH_2Cl_2$ (200 g) and 1000 ppm MeHQ were added to the reaction flask and allowed to stir until the siloxane resin was completely dissolved. To the addition funnel were added 5 g $CH_{Cl2}$ and 743 mg (4.78 mmol) IEM. The solution in the addition funnel was then added dropwise to the contents of the round bottom flask. Vigorous stirring was maintained throughout the 1 hr period it took for this addition. After this period of time, the addition funnel was rinsed with 5 g $CH_2Cl_2$ and the reaction proceeded in accordance with the description of Example 1, Step 1.

Step 2

To a reaction vessel equipped as the reaction vessel of Example 1, Step 2, were charged 834 mg (4.79 mmol) TDI and 25 g $CH_2Cl_2$. The addition funnel was charged with the mixture from Step 1 above, which was added dropwise over a 6 hr period to the contents of the reaction vessel. After the addition was completed, the addition funnel was rinsed with 25 g $CH_2Cl_2$ and the reaction was oxygenated and monitored in accordance with Step 2 of Example 1.

Step 3

This step of the preparation proceeded in accordance with the description of Example 1, Step 3, except that 1.72 g (1.65 mmol) GLUCAM E-20, 5 g $CH_2Cl_2$ and approximately 50 mg stannous octoate were charged into the reaction vessel and the addition took about 2 hrs to complete instead of the 3 hrs reported in Example 1.

The resulting product which was formed after the solvent was evaporated off was a viscous liquid which was ready for formation into a lens.

EXAMPLE 3

Preparation of a 75% PS510/25% PS513 Siloxane Prepolymer

Step 1

To a reaction vessel prepared and equipped like the reaction vessel of Example 1, Step 1, were charged 75 g (28.8 mmol) PS510, 25 g PS513 (1.50 mmol), 100 mg MeHQ, and 250 g $CH_2Cl_2$. The addition funnel was charged with 15 g $CH_2Cl_2$ and 4.70 g (30.3 mmol) IEM. This solution in the addition funnel was added to the contents of the reaction flask dropwise over a 2 hr time period. Vigorous stirring was continuously maintained throughout this addition step. The addition funnel was thereafter rinsed with 5 g $CH_2Cl_2$ and the reaction mixture was then treated in accordance with the description of Example 1, Step 1.

Step 2

To the reaction vessel of Example 1, Step 2, were charged 5.29 g (30.3 mmol) TDI and 30 g $CH_2Cl_2$. The addition funnel was charged with the mixture from Step 1 above, and the contents thereof were then added dropwise to the TDI-CH$_2$Cl$_2$ solution. This addition took about 4 hrs to complete, after which the addition funnel was charged with 25 g CH$_2$Cl$_2$. The reaction procedure was thereafter in accordance with the description of Example 1, Step 2.

Step 3

To an addition funnel were charged 10.9 g (10.4 mmol) GLUCAM E-20, 20 g CH$_2$Cl$_2$ and a catalytic amount of stannous octoate (100–150 mg). This solution was added dropwise, over a period of about 1 hr to the reaction mixture of Step 2. After the addition was completed, the addition funnel was rinsed with 25 g CH$_2$Cl$_2$ and the reaction procedure thereafter was as described in Step 3 of Example 1.

EXAMPLE 4

Preparation of 50% PS510/50% PS513 Siloxane Prepolymer

Step 1

To a reaction vessel prepared and equipped like that used in Example 1, Step 1, were charged 50 g (19.2 mmol) PS510, 50 g (3.0 mmol) PS513, 100 mg MeHQ and 250 g CH$_2$Cl$_2$. To the 50 ml addition funnel was added 15 g CH$_2$Cl$_2$ and 3.44 g (22.2 mmol) IEM. This solution in the addition funnel was added dropwise, with vigorous stirring, to the contents of the round bottom flask. The addition took about 1 hr to complete, at which point the addition funnel was rinsed with 5 g CH$_2$Cl$_2$. The reaction procedure of this step then proceeded in accordance with Example 1, Step 1.

Step 2

To a reaction vessel equipped like that of Example 1, Step 2, were charged 3.87 g (22.2 mmol) TDI and 30 g CH$_2$Cl$_2$. The addition funnel was charged with the mixture of Step 1 above and the contents thereof were then added, dropwise, with vigorous stirring to the TDI/CH$_2$Cl$_2$ mixture. This addition took about 4 hrs to complete. After this period of time, the addition funnel was rinsed with 25 g CH$_2$Cl$_2$ and the reaction proceeded in accordance with Example 1, Step 2.

Step 3

To an addition funnel were charged 8.0 g (7.66 mmol) GLUCAM E-20, 20 g CH$_2$Cl$_2$ and a catalytic amount, 100–150 mg, of stannous octoate. This solution was added dropwise, over a period of about 1 hr, to the reaction mixture from Step 2. After the addition was completed, the addition funnel was rinsed with 25 g CH$_2$Cl$_2$ and the reaction proceeded in accordance with Example 1, Step 3.

EXAMPLE 5

Preparation of 25% PS510/75% PS513 Siloxane Prepolymer step 1

To a reaction vessel prepared and equipped like the reaction vessel of Example 1, Step 1, were charged 25 g (9.62 mmol) PS510, 75 g (4.49 mmol) PS513, 100 mg MeHQ, and 250 g CH$_2$Cl$_2$. To the addition funnel were added 5 g CH$_2$Cl$_2$ and 2.19 g (14.1 mmol) IEM. The solution of the addition funnel was added dropwise, with vigorous stirring, to the contents of the round bottom flask. After the addition was completed (1 hr), the addition funnel was rinsed with 5 g CH$_2$Cl$_2$ and the reaction procedure proceeded in accordance with Example 1, Step 1.

Step 2

To a reaction vessel like that of Example 1, Step 2, were charged 2.46 g (14.1 mmol) TDI and 15 g CH$_2$Cl$_2$. The addition funnel was charged with the mixture prepared in Step 1 above and this mixture was added to the TDI/CH$_2$Cl$_2$ mixture dropwise, over a period of about 4 hrs. After the addition was completed, the addition funnel was rinsed with 25 g CH$_2$Cl$_2$ and the reaction procedure proceeded in accordance with the description of Example 1, Step 2.

Step 3

To an addition funnel were added 5.12 g (4.9 mmol) GLUCAM E-20, 10 g CH$_2$Cl$_2$ and a catalytic amount (100–150 mg) of stannous octoate. This solution was added dropwise, over a 1 hr period, to the reaction mixture of Step 2. After the addition was completed, the addition funnel was rinsed with 5 g CH$_2$Cl$_2$ and the reaction proceeded in accordance with Example 1, Step 3.

EXAMPLE 6

Preparation of 100% PS555 Siloxane Prepolymer

Step 1

To a reaction vessel prepared and equipped like the reaction vessel of Example 1, Step 1, were charged 80 g (57.7 mmol) PS555, a carbinol terminated polydimethyl siloxane resin (MW 1386 g/mol) obtained from Huls America, Inc., 200 g CH$_2$Cl$_2$, 1000 ppm MeHQ and a catalytic amount of stannous octoate (150–200 mg). The contents of the reaction vessel were allowed to stir until the siloxane resin was completely dissolved. To the addition funnel was added 20 g CH$_2$Cl$_2$ and 8.95 g (57.7 mmol) IEM. This solution was added dropwise, with vigorous stirring, to the PS555/CH$_2$Cl$_2$ reaction mixture. This addition step took about 3 hrs to complete, at which point the addition funnel was rinsed with an additional 10 g CH$_2$Cl$_2$. The reaction was then allowed to proceed in accordance with the description of Example 1, Step 1.

Step 2

To a reaction vessel equipped like that of Example 1, Step 2, were charged 12.8 g (57.8 mmol) isophorone diisocyanate (IPDI), 125 g CH$_2$Cl$_2$ and 100 mg stannous octoate. The addition funnel was charged with the reaction mixture produced in Step 1 and was added dropwise, over a period of about 7 hrs. After this period of time, the addition funnel was rinsed with 50 g CH$_2$Cl$_2$ and dry oxygen gas was bubbled into the mixture for 30 min. The reaction progress was followed as in Example 1, Step 2.

Step 3

To an addition funnel were charged 20.8 g (19.9 mmol) GLUCAM E-20, 25 g CH$_2$Cl$_2$, and a catalytic amount of stannous octoate (100 mg). This solution was added dropwise, over a period of about 3 hrs, to the reaction mixture produced in Step 2 above. After the addition was completed, the addition funnel was rinsed with 5 g CH$_2$Cl$_2$ and the contents of the reaction flask were purged with dry O₂ for 30 minutes. The reaction process was monitored as in Example 1, Step 3.

EXAMPLE 7

Preparation of 100% PS556 Siloxane Prepolymer

Step 1

To a reaction vessel prepared and equipped like the reaction vessel of Example 1, Step 1, were charged 80 g (50.8 mmol) PS556, a carbinol terminated polydimethyl siloxane resin (MW 1575 g/mol) obtained from Huls America, Inc., 200 g $CH_2Cl_2$, 1000 ppm MeHQ and a catalytic amount (150–200 mg) of stannous octoate. The contents of the reaction vessel were allowed to stir until the siloxane resin was completely dissolved. The addition funnel was charged with 20 g $CH_2Cl_2$ and 7.88 g (50.8 mmol) IEM. This solution was then added dropwise, over a 3 hr period, to the contents of the round bottom flask. After the 3 hr period, the addition funnel was charged with an additional 10 g $CH_2Cl_2$. The reaction was then allowed to proceed in the manner indicated in Example 1, Step 1.

Step 2

A reaction vessel equipped like that described in Example 1, Step 2, were charged with 11.3 g (50.8 mmol) IPDI, 125 g $CH_2Cl_2$ and 50 mg stannous octoate. The addition funnel was charged with the mixture produced in Step 1 above, and this mixture was added to the IPDI/$CH_2Cl_2$/stannous octoate mixture dropwise, over a period of about 7 hrs. After completion of the addition step, 50 g $CH_2Cl_2$ was used to wash the addition funnel and the reaction was allowed to proceed in accordance with Example 1, Step 2.

Step 3

An addition funnel was charged with 18.3 g (17.5 mmol) GLUCAM E-20, 40 g $CH_2Cl_2$, and 100 mg stannous octoate. This solution was added dropwise, over a period of 3 hrs, to the reaction mixture produced in Step 2. After completion, the addition funnel was rinsed with 5 g $CH_2Cl_2$ and the reaction proceeded in accordance with Example 1, Step 3.

EXAMPLE 8

Preparation of 100% JEFFAMINE D-2000 Prepolymer

Step 1

To a reaction vessel prepared and equipped like the reaction vessel of Example 1, Step 1, were added 100 g (76.3 mmol) of JEFFAMINE D-2000, an amine terminated polypropylene glycol resin (MW 1310 g/mol) obtained from Huntsman and 250 g of $CH_2Cl_2$ and 1000 mg of MeHQ. The addition funnel was charged with 25 g $CH_2Cl_2$ and 11.8 g (76.3 mmol) IEM. This solution was added dropwise, with vigorous stirring, to the reaction mixture containing the JEFFAMINE resin. This addition took about 6 hrs to complete, at which time the addition funnel was rinsed with 10 g $CH_2Cl_2$. This reaction then proceeded in accordance with the description of Example 1, Step 1.

Step 2

To a reaction vessel equipped like that of Example 1, Step 2, were charged 13.3 g (76.4 mmol) TDI and 125 g $CH_2Cl_2$. The addition funnel was charged with the mixture from Step 1 above, and this mixture was added dropwise, over a 6 hr period, to the contents of the round bottom flask. After completion, the addition funnel was rinsed with 50 g $CH_2Cl_2$ and the reaction proceeded in accordance with Example 1, Step 2.

Step 3

To an addition funnel were added 27.9 g (26.7 mmol) GLUCAM E-20, 60 g $CH_2Cl_2$ and 150 mg stannous octoate. The solution was added dropwise, over a period of about 3 hrs, to the reaction mixture from Step 2. After the addition was completed, the addition funnel was rinsed with 5 g $CH_2Cl_2$ and the contents of the reaction flask purged with dry oxygen for 30 min. The reaction progress was followed, as in Example 1, Step 3, by monitoring the disappearance of the isocyanate absorption at 2270 $cm^{-1}$.

EXAMPLE 9

Synthesis of 25% JEFFAMINE D-2000/75% PS513 Prepolymer

Step 1

Twenty-five grams (19.1 mmol) JEFFAMINE D-2000, 56.3 g (21.7 mmol) PS513, 1000 ppm MeHQ and 250 g $CH_2Cl_2$ were charged to a reaction vessel prepared and equipped like that of Example 1, Step 1. To the addition funnel were added 15 g methylene chloride and 6.37 g (41.1 mmol) IEM. This solution was added dropwise, with vigorous stirring, to the round bottom flask. The addition took 2.0 hrs to complete, at which point the addition funnel was rinsed with an additional 10 g of solvent ($CH_2Cl_2$), removed, and replaced with a gas diffuser connected to a dry oxygen cylinder. The reaction mixture was purged with oxygen for 20 min, the gas diffuser removed and replaced with a glass stopper. The reaction progress was followed by the procedure described in Example 1, Step 1.

Step 2

A reaction vessel equipped like that of Example 1, Step 2, was charged with 7.3 g (42.0 mmol) TDI and 40 g $CH_2Cl_2$. The addition funnel was charged with the mixture from Step 1, and this solution was added to the contents of the 1 L round bottom flask dropwise, over a period of about 6 hrs. After the addition was completed, the addition funnel was rinsed with 50 g of solvent, and dry oxygen gas was bubbled into the mixture for 30 min. The reaction progress was followed as in Example 1, Step 2 by monitoring the reduction in the intensity of the isocyanate peak.

Step 3

A 60 mL addition funnel was charged with 15.3 g (14.7 mmol) GLUCAM E-20, 40 g $CH_2Cl_2$ and a catalytic amount of stannous octoate (150 mg). This solution was added dropwise, over a period of about 1 hr, to the reaction mixture from Step 2. After the addition was completed, the addition funnel was rinsed with 5 g $CH_2Cl_2$ and the contents of the reaction flask was then purged with dry oxygen for 30 min. The reaction progress was followed, as in Example 1, Step 3, by monitoring the disappearance of the isocyanate absorption at 2270 $cm^{-1}$.

EXAMPLE 10

Synthesis of 50% JEFFAMINE D-2000/37.5% PS510/12.5% PS513 Prepolymer

Step 1

50 g (38.2 mmol) JEFFAMINE D-2000, 37.5 g (14.4 mmol) PS510, 12.5 g (0.75 mmol) PS513, 1000 ppm MeHQ, and 250 g CH$_2$Cl$_2$ were charged into a reaction vessel prepared and equipped like that of Example 1, Step 1. To the addition funnel were added 20 g CH$_2$Cl$_2$ and 8.3 g (53.4 mmol) IEM. This solution was added dropwise, with vigorous stirring, to the round bottom flask. The addition took about 3.0 hrs to complete, at which point the addition funnel was rinsed with an additional 10 g CH$_2$Cl$_2$, removed, and replaced with a gas diffuser connected to a dry oxygen cylinder. The reaction mixture was purged with oxygen for 20 min, the gas diffuser removed and replaced with a glass stopper. The reaction progress was followed in accordance with Step 1 of Example 1.

Step 2

A reaction vessel equipped like that of Example 1, Step 2 was charged with 9.3 g (53.3 mmol) TDI and 50 g CH$_2$Cl$_2$. The addition funnel was charged with the mixture from Step 1, and this solution added to the contents of the 1L round bottom flask dropwise, over a period of about 6 hrs. After the addition was completed, the addition funnel was rinsed with 50 g of solvent, and dry oxygen gas was bubbled into the mixture for 30 min. The reaction progress was followed by monitoring the reduction in the intensity of the isocyanate peak.

Step 3

A 60 mL addition funnel was charged with 19.4 g (18.6 mmol) GLUCAM E-20, 40 g CH$_2$Cl$_2$, and a catalytic amount of stannous octoate (approximately 150 mg). This solution was added dropwise, over a period of 1 hr, to the reaction mixture from Step 2. After the addition was completed, the addition funnel was rinsed with 5 g CH$_2$Cl$_2$ and the contents of the reaction flask purged with dry oxygen for 30 min. The reaction progress was followed by monitoring the disappearance of the isocyanate absorption at 2270 cm$^{-1}$.

A viscous liquid product was produced after evaporating the solvent off.

EXAMPLE 11

Synthesis of 75% JEFFAMINE D-2000/18.7% PS510/6.3% PS513 Prepolymer

Step 1

Seventy-five grams (57.3 mmol) JEFFAMINE D-2000, 18.7 g (7.20 mmol) PS510, 6.25 g (0.37 mmol) PS 513, 1000 ppm MeHQ, and 250 g CH$_2$Cl$_2$ were charged to a reaction vessel prepared and equipped like that of Example 1, Step 1. To the addition funnel were added 25 g CH$_2$Cl$_2$ and 9.85 g (63.5 mmol) IEM. This solution was added dropwise, with vigorous stirring, to the round bottom flask. The addition took about 3.0 hrs to complete, at which point the addition funnel was rinsed with an additional 10 g CH$_2$Cl$_2$, and the reaction proceeded in accordance with Example 1, Step 1.

Step 2

A 1L three neck, round bottom flask equipped like that of Example 1, Step 2 was charged with 11.3 g (64.9 mmol) TDI and 60 g CH$_2$Cl$_2$. The addition funnel was charged with the mixture from Step 1, and this solution was added to the contents of the 1L round bottom flask dropwise, over a period of about 4 hrs. After the addition was completed, the addition funnel was rinsed with 50 g of solvent, and dry oxygen gas was bubbled into the mixture for 30 min. The reaction progress was followed by monitoring the reduction in the intensity of the isocyanate peak.

Step 3

A 60 mL addition funnel was charged with 23.7 g (22.7 mmol) GLUCAM E-20, 50 g CH$_2$Cl$_2$, and a catalytic amount of stannous octoate (approximately 150 mg). This solution was added dropwise, over a period of 1 hr, to the reaction mixture from Step 2. After the addition was completed, the addition funnel was rinsed with 5 g CH$_2$Cl$_2$ and the contents of the reaction flask purged with dry oxygen for 30 min. The reaction progress was followed by monitoring the disappearance of the isocyanate absorption at 2270 cm$^{-1}$.

EXAMPLE 12

Production of Soft Contact Lenses

A photoreactive formulation was prepared by mixing 64 g of the siloxane prepolymer of Example 1 and 0.23 g Darocur 1173 (2-hydroxy-2-methyl propiophenone), a photoinitiator. The resulting mixture was then mechanically stirred for 1 hr at room temperature. The formulation was then degassed under reduced pressure (<5 mm Hg) at 65° C. for 0.5 hr. This degassing step helps remove entrapped bubbles resulting from the mechanical agitation used to mix the components.

Degassed (12 hrs, <5 mmHg) polystyrene molds were then filled with the reactive formulation, and the filled molds were then cured under a UV light for 4 min. An arc lamp with an average intensity output of 55 mW/cm$_2$ was used to effect the cure. A force equivalent to a 4 kg mass was applied to the two piece molds to ensure a clean edge on the lenses. The weight was applied to the molds for a total of 5 min, with a 1 min pre-cure period (i.e. no UV exposure) followed by the 4 min UV cure cycle. The mold pieces were then separated, and the lenses released from the molds by soaking in methanol for 3 minutes. The lenses were then allowed to equilibrate in physiological saline at 35° C. for 3 days prior to testing.

EXAMPLE 13

Production of Soft Contact Lenses

Soft contact lenses were prepared in accordance with the procedure of Example 12, except that a mixture of 67 g of the siloxane prepolymer of Example 2 and 0.24 g Darocur 1173 was employed.

EXAMPLE 14

Production of Soft Contact Lenses

Soft contact lenses were prepared in accordance with the procedure of Example 12, except that a mixture of 40 g of the siloxane prepolymer of Example 6 and 0.14 g Darocur 1173 was employed. Furthermore, the arc lamp used to effect curing had an average intensity output of 75 mW/cm$^2$.

EXAMPLE 15

Production of Soft Contact Lenses

A photoreactive formulation was prepared by mixing 40.4 g of the siloxane prepolymer of Example 1, 16.2 g toluene (used as an inert diluent to reduce the material viscosity) and 0.2 g Darocur 1173. The resulting mixture was mechanically stirred for 1 hr at room temperature and then degassed under reduced pressure (<5 mm Hg) at 65° C. for 0.5 hr. This step helps remove entrapped bubbles resulting from the mechanical agitation used to mix the components.

Degassed (12 hrs, <5 mm Hg) polypropylene molds were then filled with the reactive formulation, and the filled molds were then cured under a UV light for 4 min. An arc lamp with an average intensity output of 75 mW/cm$^2$ was used to effect the cure. A force equivalent to a 4 kg mass was applied to the two piece molds to ensure a clean edge on the lenses. The weight was applied to the molds to ensure a clean edge on the lenses. The weight was applied to the molds for a total of 5 min, with a 1 min pre-cure period followed by the 4 min UV cure cycle. The mold pieces were then separated, and the lenses released from the molds by soaking in methanol for 1 hr. This step helps extract some of the toluene from the lenses. The lenses were then allowed to equilibrate in physiological saline at 35° C. for 3 days prior to testing.

EXAMPLE 16

Production of Soft Contact Lenses

Soft contact lenses were prepared in accordance with the procedure described in Example 15, except that a mixture of 85.5 g of the siloxane prepolymer of Example 3, 34.2 g toluene and 0.42 g Darocur 1173 was employed.

EXAMPLE 17

Production of Soft Contact Lenses

Soft contact lenses were prepared in accordance with the procedure described in Example 15, except that a mixture of 76.9 g of the siloxane prepolymer of Example 4, 30.7 g toluene, and 0.38 g Darocur 1173 was employed.

EXAMPLE 18

Preparation of Soft Contact Lenses

Soft contact lenses were prepared in accordance with the procedure of Example 15, except that a mixture of 64.0 g of the siloxane prepolymer of Example 5, 25.6 g toluene and 0.31 g Darocur 1173 was employed.

EXAMPLE 19

Preparation of Soft Contact Lenses

Soft contact lenses were prepared in accordance with the procedure of Example 15, except that a mixture of 39.9 g of the siloxane prepolymer of Example 3, 15.5 g styrene and 0.14 g of Darocur 1173 was employed. Also, the average intensity output of the arc lamp during curing was 26 mW/cm$^2$.

EXAMPLE 20

Preparation of Soft Contact Lenses

Soft contact lenses were prepared in accordance with the procedure of Example 15, except that a mixture of 40.4 g of the siloxane prepolymer of Example 4, 16.2 g styrene and 0.14 g of Darocur 1173 was employed.

EXAMPLE 21

Preparation of Soft Contact Lenses

Soft contact lenses were prepared in accordance with the procedure of Example 19, except that a mixture of 40.3 g of the siloxane prepolymer of Example 5, 16.1 g styrene and 0.14 g Darocur 1173 was employed.

EXAMPLE 22

Preparation of Soft Contact Lenses

Soft contact lenses were prepared in accordance with the procedure of Example 15, except that a mixture of 52.2 g of the siloxane prepolymer of Example 9, 20.9 g toluene and 0.26 g Darocur 1173 was employed.

EXAMPLE 23

Preparation of Soft Contact Lenses

Soft contact lenses were prepared in accordance with the procedure of Example 15, except that a mixture of 50.5 g of the siloxane prepolymer of Example 10, 20.2 g toluene and 0.25 g Darocur 1173 was employed.

DETERMINATION OF PHYSICAL CHARACTERISTICS OF PREPARED CONTACT LENSES

The contact lenses prepared in Examples 12–23 were then subjected to each of the following test methods, the results of which are tabulated in Table 1.

Test Method 1

Tensile Properties (Modulus, Elongation and Strength)

The lens to be tested was cut to the desired specimen size and shape, and the cross sectional area measured. The sample was then attached into the grips of the constant rate of crosshead movement type of testing instrument equipped with a load cell. The sample was then elongated at a constant rate of strain, and the resulting stress-strain curve was recorded. The elongation is expressed in percent, and the tensile modulus and strength in psi (lbs/in$^2$).

Test Method 2

Gravimetric Water Content

Determination of the water content of lenses was carried out by first weighing lenses that have been equilibrated in saline, and subsequently drying such lenses under reduced pressure (<5 mm Hg) at 65° C. for 2 hrs. The dried lenses are then weighed and the gravimetric water content was calculated as follows:

$$\% \text{ Water} = 100 \times (m_{wet} - m_{dry})/m_{wet}$$

where $m_{wet}$ represents the wet lens mass (mass of polymer plus mass of saline), and $m_{dry}$ represents the dry polymer mass.

Test Method 3

Oxygen Permeability

The oxygen permeability was measured by the method of Fatt et al., "Measurement of Oxygen Transmissibility and Permeability of Hydrogel Lenses and Materials", International Contact Lens Clinic, Vol. 9/No. 2, March/April 1982, p 76. A polarographic oxygen sensor consisting of a 4 mm diameter gold cathode and a silver-silver chloride ring anode was used in this method. The measured oxygen permeability is denoted by Dk, where D represents the diffusion coefficient for oxygen in the material being tested, and k is the solubility of oxygen in the material. The permeability (Dk) units are ($cm^2/s$) (mL $O_2$/mL * mm Hg).

TABLE 1

| Example (no.) | Diluent | RESIN COMPOSITION | | | | Tensile Strenght (psi) | Elong. at Break (%) | Modulus (psi) | % Water | Dk | Lens Diam. (mm) |
| --- | --- | --- | --- | --- | --- | --- | --- | --- | --- | --- | --- |
| | | PS510 (%) | PS513 (%) | PS555 (%) | JO2000 (%) | | | | | | |
| 12 | None | 100 | — | — | — | 187 ± 23 | 97 ± 16 | 121 ± 11 | 10.1 ± 0.3 | 415 | — |
| 13 | None | — | 100 | — | — | 50 ± 6 | 377 ± 67 | 26 ± 2 | 3.1 ± 0.1 | 519 | — |
| 14 | None | — | — | 100 | — | 80 ± 16 | 49 ± 12 | 89 ± 14 | 40.9 ± 0.3 | 59.5 | — |
| 15 | 40% Toluene | 100 | — | — | — | 59 ± 17 | 116 ± 41 | 67 ± 8 | 6.8 ± 0.2 | 306 | 11.54 ± 0.16 |
| 16 | 40% Toluene | 75 | 25 | — | — | 88 ± 22 | 235 ± 57 | 61 ± 6 | 5.1 ± 0.2 | 253 | 11.76 ± 0.27 |
| 17 | 40% Toluene | 50 | 50 | — | — | 95 ± 28 | 339 ± 67 | 40 ± 2 | 4.6 ± 0.1 | 805 | 12.14 ± 0.16 |
| 18 | 40% Toluene | 25 | 75 | — | — | 61 ± 5 | 412 ± 59 | 25 ± 1 | 3.6 ± 0.3 | 301 | 12.25 ± 0.12 |
| 19 | 40% Styrene | 75 | 25 | — | — | 129 ± 31 | 330 ± 185 | 64 ± 8 | 5.5 ± 0.0 | 457 | 11.79 ± 0.38 |
| 20 | 40% Styrene | 50 | 50 | — | — | 110 ± 42 | 228 ± 113 | 74 ± 9 | 4.3 ± 0.8 | 5.43 | 12.15 ± 0.17 |
| 21 | 40% Styrene | 25 | 75 | — | — | 66 ± 18 | 323 ± 90 | 39 ± 6 | 3.5 ± 0.3 | 772 | 12.23 ± 0.12 |
| 22 | 40% Toluene | 56.3 | 16.7 | — | 25.0 | 222 ± 33 | 244 ± 34 | 297 ± 42 | 10.6 ± 0.4 | 131 | — |
| 23 | 40% Toluene | 37.5 | 12.5 | — | 50.0 | 200 ± 25 | 236 ± 36 | 349 ± 41 | 11.1 ± 0.3 | 180 | — |

The results tabulated above clearly show that lenses prepared in accordance with the present invention exhibit high $O_2$ permeability as well as a good balance of mechanical properties, such as tensile strength, elongation and modulus.

The above preferred embodiments and examples are given to illustrate the scope and spirit of the invention. These embodiments and examples will make apparent to those skilled in the art other embodiments and examples, which are also within the contemplation of the instant invention. Therefore, the present invention should be limited only to the appended claims.

What is claimed is:

1. A soft ophthalmic lens adapted for placement over the cornea or in the eye made from a polymer having repeating units of the following structural formula:

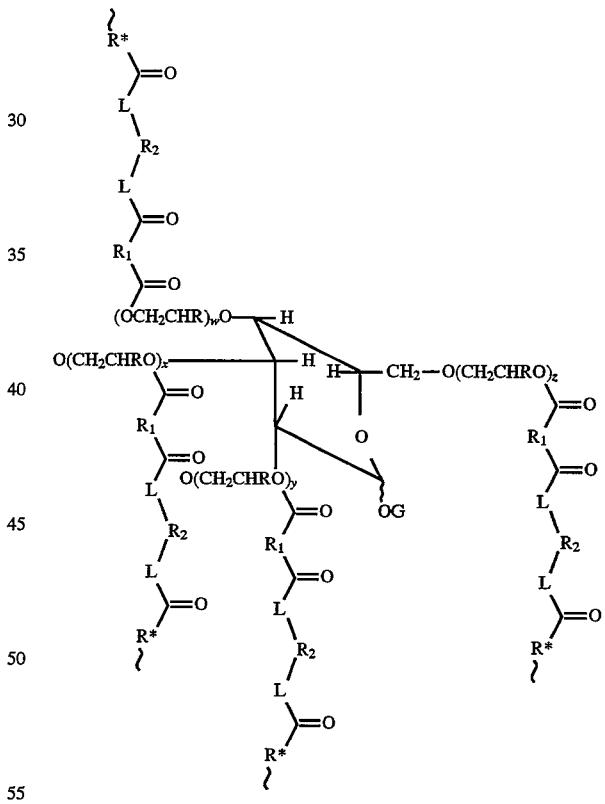

wherein each R is independently hydrogen or methyl; G is an alkyl group containing from 1 to about 7 carbon atoms; each $R_1$ is independently —NH—D—NH— wherein D is a hydrocarbyl residue containing 4 to 15 carbon atoms and 0, 1 or 2 optionally fused rings which can be saturated or unsaturated; each $R_2$ is independently a moiety of formula (i) or (ii)

$$-(CH_2)_{3-7}-Si(A^1)(A^2)O-(Si(A^1)(A^2)O)_n-Si(A^1)(A^2)-(CH_2)_{3-7}- \quad (i),$$

or

—CH$_2$CHR$_3$—O—(CH$_2$CHR$_3$O)$_m$—CH$_2$CHR$_3$—    (ii), wherein A$^1$ in each occurrence is an alkyl group containing from 1 to about 3 carbon atoms or benzyl, A$^2$ in each occurrence is an alkyl group containing from 1 to about 3 carbon atoms, R$_3$ is hydrogen or methyl; n is from about 10 to about 300, and m is from about 5 to about 100, provided that R$_2$ in at least one occurrence is a moiety of formula (i);

each —L— is independently —O— or —NH—;
each R* is independently

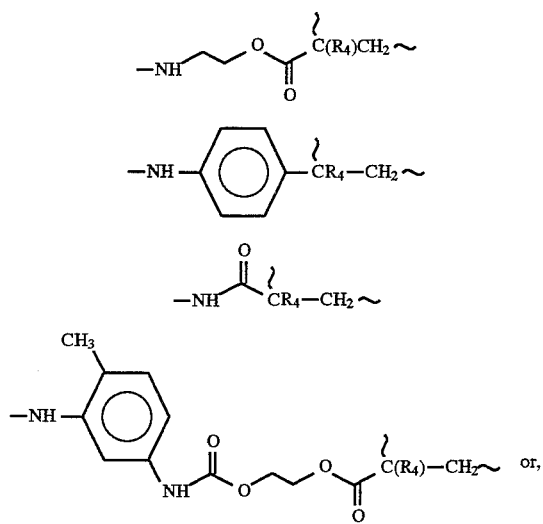

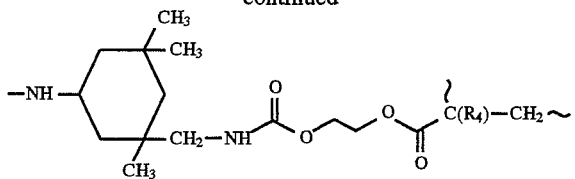

wherein each R$_4$ is independently hydrogen or methyl; each of w, x, y and z independently range from 0 to 200, with the proviso that $5 \leq (w+x+y+z) \leq 200$.

2. A soft ophthalmic lens of claim 1 wherein each R$_2$ is a moiety of formula (i).

3. A soft ophthalmic lens of claim 2 wherein R$_2$ has the formula

—(CH$_2$)$_3$—Si(CH$_3$)$_2$O—(Si(CH$_3$)$_2$O)$_n$—Si(CH$_3$)$_2$—(CH$_2$)$_3$—.

4. A Soft ophthalmic lens of claim 3 wherein n is from about 15 to about 225.

5. A soft ophthalmic lens of claim 1 wherein G is methyl.

6. A soft ophthalmic lens of claim 1 wherein each —NH—D—NH— is independently

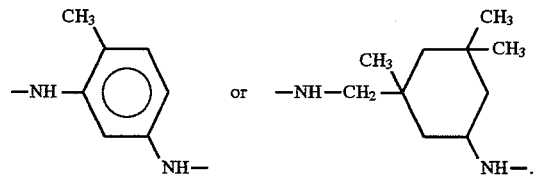

7. A soft ophthalmic lens of claim 1 wherein each R * is —NH(CH$_2$)$_2$OC(O)C(R$_4$)—CH$_2$~.

* * * * *